(12) United States Patent
Park et al.

(10) Patent No.: US 7,702,286 B2
(45) Date of Patent: Apr. 20, 2010

(54) RDS DATA SECURITY APPARATUS AND METHOD

(75) Inventors: Sung-joon Park, Suwon-si (KR); Hung-joon Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 836 days.

(21) Appl. No.: 11/513,119

(22) Filed: Aug. 31, 2006

(65) Prior Publication Data

US 2007/0050674 A1 Mar. 1, 2007

(30) Foreign Application Priority Data

Sep. 1, 2005 (KR) .................. 10-2005-0081331

(51) Int. Cl.
*H04B 17/00* (2006.01)
(52) U.S. Cl. ..................... 455/67.11; 726/26
(58) Field of Classification Search .............. None
See application file for complete search history.

(56) References Cited

U.S. PATENT DOCUMENTS

2002/0052968 A1* 5/2002 Bonefas et al. .............. 709/231
2005/0144475 A1* 6/2005 Sakaki et al. ............... 713/200

FOREIGN PATENT DOCUMENTS

| JP | 06-054105 | 2/1994 |
| JP | 09-149187 | 6/1997 |
| JP | 09-153999 | 6/1997 |
| JP | 2001-034120 | 2/2001 |

* cited by examiner

*Primary Examiner*—Thanh C Le
(74) *Attorney, Agent, or Firm*—Roylance, Abrams, Berdo & Goodman, LLP

(57) ABSTRACT

A remote diagnostic system (RDS) data security device and method are provided, in which an interface unit receives an RDS command from a host, a storage unit stores a security setting for RDS data, and a control unit performs an operation for the RDS data according to the RDS command and the security setting, wherein the result obtained by the performance is selectively transmitted externally. Accordingly, since the reading and writing operations of RDS data are performed according to an RDS command received from the host and previously stored security setting, and the result obtained by the reading and writing operations is displayed, data collected in the RDS can be prevented from being transmitted to the server without permission, and data allowed to an authorized user can be transmitted to the server.

15 Claims, 3 Drawing Sheets

RDS DATA SECURITY APPARATUS AND METHOD

CROSS-REFERENCE TO RELATED PATENT APPLICATIONS

This application claims the benefit under 35 U.S.C. §119 (a) of Korean Patent Application No. 10-2005-0081331, filed on Sep. 1, 2005, in the Korean Intellectual Property Office, the entire disclosure of which is hereby incorporated by reference.

BACKGROUND OF THE INVENTION

1. Field of the Invention

The present invention relates to a remote diagnostic system (RDS) data security method and apparatus. More particularly, the present invention relates to a method and device for securing RDS data by performing an RDS operation according to an RDS command and a security setting, and displaying a result obtained from the performance.

2. Description of the Related Art

Remote diagnostic systems (RDSs) allow a seller or a management company to diagnose a user's product remotely without visiting a user. RDSs receive a command from a host or a web, diagnose the state of a printer, change a state value of the printer, or inform a user of an error. RDSs are classified into an RDS client module included in a product and an RDS server module that collects RDS information. An RDS client comprises a customer replaceable unit monitor (CRUM), a toner level, an input/out (I/O) interface, a finisher, a scanner, a duplex automatic document feeder (DADF), an automatic document feeder (ADF), and a memory. The I/O interface comprises a fax, a USB, a parallel, and a network. Furthermore, RDSs include a software module for performing various functions, printer user record, and a printer error record.

When the RDS client receives a diagnosis event, the RDS diagnoses each of the modules and transmits the diagnostic results to an RDS server.

The diagnostic results transmitted from the RDS to the RDS server may include business information of the user or delicate information that is not intended to be disclosed. RDS data reading and writing may be classified in terms of the data importance. For example, in a printer, since RDS data such as kinds of paper, a setting, a manager's name, a system date, and a department using the printer have a lower importance, both reading and writing can be performed on the RDS data. However, since a printer access log record, a printer IP address, a job list stored in a printer hard disk, a list of data processed by the printer, and the like are very important data in operating and securing the printer, the writing is not allowed.

The conventional RDSs transmit any collected information to the RDS server. That is, the RDS does not transmit RDS data selected by the user but RDS data selected by a service provider. Information collected in an environment of a particular company or office may include confidential information that is restricted and is not to be transmitted externally. In this case, a network manager may block the RDS data using a firewall. However, using a firewall is costly. Thus, there is a need for a method of selectively transmitting the RDS data according to a security policy without the firewall.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a remote diagnostic system (RDS) data security apparatus and method, which performs reading and writing operations for RDS data according to an RDS command received from a host and previously stored security setting, and displays a result obtained by the performance to prevent data collected by the RDS from being transmitted to a server without a user's permission and reinforce a RDS data security.

According to an aspect of exemplary embodiments of the present invention, there is provided a remote diagnostic system (RDS) data security apparatus, in which an interface unit receives an RDS command from a host; a storage unit stores a security setting for RDS data; and a control unit performs an operation for the RDS data according to the RDS command and the security setting, wherein the result obtained by the performance is selectively transmitted externally.

In an exemplary implementation, a display unit displays the result.

In another exemplary implementation, the control unit may store the result obtained by performing the operation of RDS data.

In still another exemplary implementation, the control unit may determine whether to transmit the result stored in the storage unit to a server according to a command input by a user after the user verifies the result displayed on the display unit, and the security setting.

In a further exemplary implementation, the display unit may be included in the RDS data security apparatus or is an external device connected to the RDS data security apparatus via a network.

In an exemplary implementation, the security setting may require authentication according to the RDS data importance.

In another exemplary implementation, the control unit may parse the RDS command to determine whether the RDS data requires authentication, and when a determination is made that the RDS data requires authentication, an error message is displayed on the display unit if the RDS data is incorrectly authenticated or not authenticated.

In still another exemplary implementation, the security setting may require different authentication requirements for the same RDS data according to the type of operations.

In a further exemplary implementation, the security setting may be set to determine whether to transmit the RDS data to the server according to an encryption level of the RDS data.

According to another aspect of exemplary embodiments of the present invention, there is provided an RDS data security, in which an RDS command is received from a host; a security setting is stored for RDS data in a storage unit; and an operation for RDS data is performed according to the RDS command and the security setting, wherein the result obtained by the performance is selectively transmitted externally.

In an exemplary implementation, the result is displayed on a displaying unit after the performing of the operation.

In another exemplary implementation, the result is stored in the storage unit after the performing of the operation.

In still another exemplary implementation, whether the result stored in the storage unit is transmitted to a server is determined according to a command input by a user after the user verifies the result displayed on the display unit, and the security setting.

In a further exemplary implementation, the display unit may be included in an RDS data security device or is an external apparatus connected to the RDS data security apparatus via a network.

In an exemplary implementation, the security setting may require authentication according to the importance of the RDS data.

In another exemplary implementation, the performing of the operation may further comprise determining whether the RDS data requires authentication by parsing the RDS command, and when a determination is made that the RDS data requires authentication, an error message is displayed on the display unit if the RDS data is incorrectly authenticated or not authenticated.

In still another exemplary implementation, the security setting may require different authentication requirements for the same RDS data according to type of operations.

In a further exemplary implementation, the security setting may be set to determine whether or not to transmit the RDS data to the server according to an encryption level of the RDS data.

BRIEF DESCRIPTION OF THE DRAWINGS

The above and other objects, features and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spiting of the invention. Also, descriptions of well-known functions and constructions are omitted for clarity and conciseness.

Figure 1:
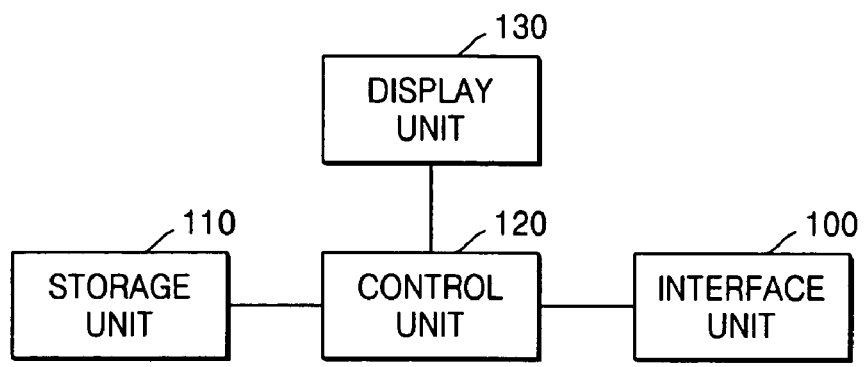
FIG. 1 is a block diagram of a remote diagnostic system (RDS) data security apparatus according to an exemplary embodiment of the present invention.

FIG. 1 is a block diagram of a remote diagnostic system (RDS) data security apparatus according to an exemplary embodiment of the present invention. Referring to FIG. 1, the RDS data security apparatus includes an interface unit 100, storage unit 110, control unit 120, and display unit 130.

The interface unit 100 serves as an input/output device to allow a peripheral device that controls and diagnoses a multifunctional device to be connected to the multifunctional device. The multifunctional device performs various functions such as printing, scanning, and facsimileing. The interface unit 100 connects the multifunctional device to the peripheral device. Further, the interface unit 100 receives a RDS command from a host (not shown).

The storage unit 110 stores a history of the multifunctional device that is controlled and diagnosed by the peripheral device, and a security setting for RDS data. Furthermore, the storage unit 110 temporarily stores data to be printed or scanned by the multifunctional device.

The storage unit 110 may be a flash memory or a hard disk.

The control unit 120 performs reading and writing operations of the RDS data according to the RDS command and the security setting. The control unit 120 stores a result obtained by reading and writing the RDS data in the storage unit 110.

The control unit 120 determines whether to transmit the result stored in the storage unit 110 to a server and a command input by a user based on the result displayed in the display unit 130 according to the security setting. The security setting may require authentication for information requiring data security according to the importance of the RDS data. The authentication may be performed using identification (ID) or a password. The authentication requirement for the same RDS data may be different according to the type of reading and writing operations.

When the security setting requires the authentication for information requiring security, the control unit 120 parses the RDS command to determine if the RDS data requires authentication. When the RDS data is incorrectly authenticated or not authenticated, although a determination is made that the RDS data requires authentication, an error message is displayed on the display unit 130.

According to an exemplary embodiment of the present invention, the security setting may be set to determine whether the RDS data is transmitted to a server according to the encryption level of the RDS data. That is, when the data may be encrypted with a high level of encryption and is transmitted to the server, the transmitted data can be read if there is a decryption key corresponding to an encryption key. Accordingly, the security setting can be set to determine the highly encrypted data to be transmitted to the server.

When the control unit 120 performs reading and writing operations of the RDS data according to the RDS command and the security setting, the display unit 130 displays the results obtained by the reading. The display unit 130 may be installed in the RDS data security apparatus or implemented as an external device connected to the RDS data security apparatus via a network.

Figure 2:
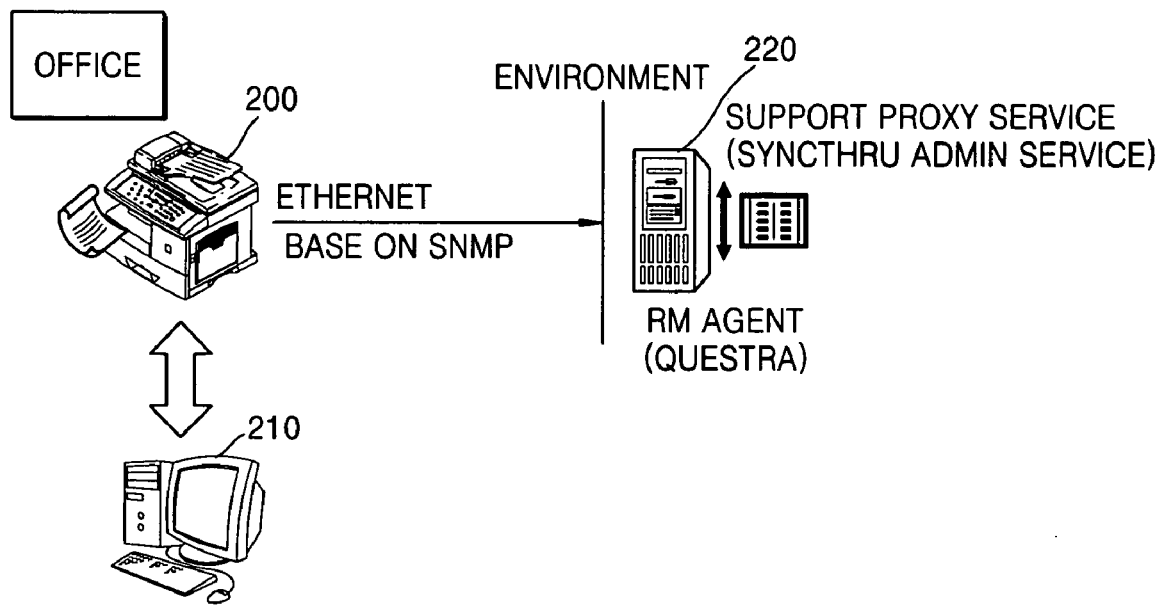
FIG. 2 is a view illustrating an RDS data security apparatus that collects RDS data, displays the RDS data, and selectively transmits the RDS data to a server in an office environment according to an exemplary embodiment of the present invention.

FIG. 2 is a view illustrating an RDS data security apparatus that collects RDS data, displays the RDS data, and selectively transmits the RDS data to a server in an office environment according to an exemplary embodiment of the present invention. Referring to FIG. 2, when a host 210 transmits an RDS command to a RDS client 200, the RDS client 200 performs an operation in response to the RDS command and transmits a result obtained by the operation to the host 210. The host 210 displays the received result and determines whether to transmit the entire or a part of the result to a server 220.

Figure 3:
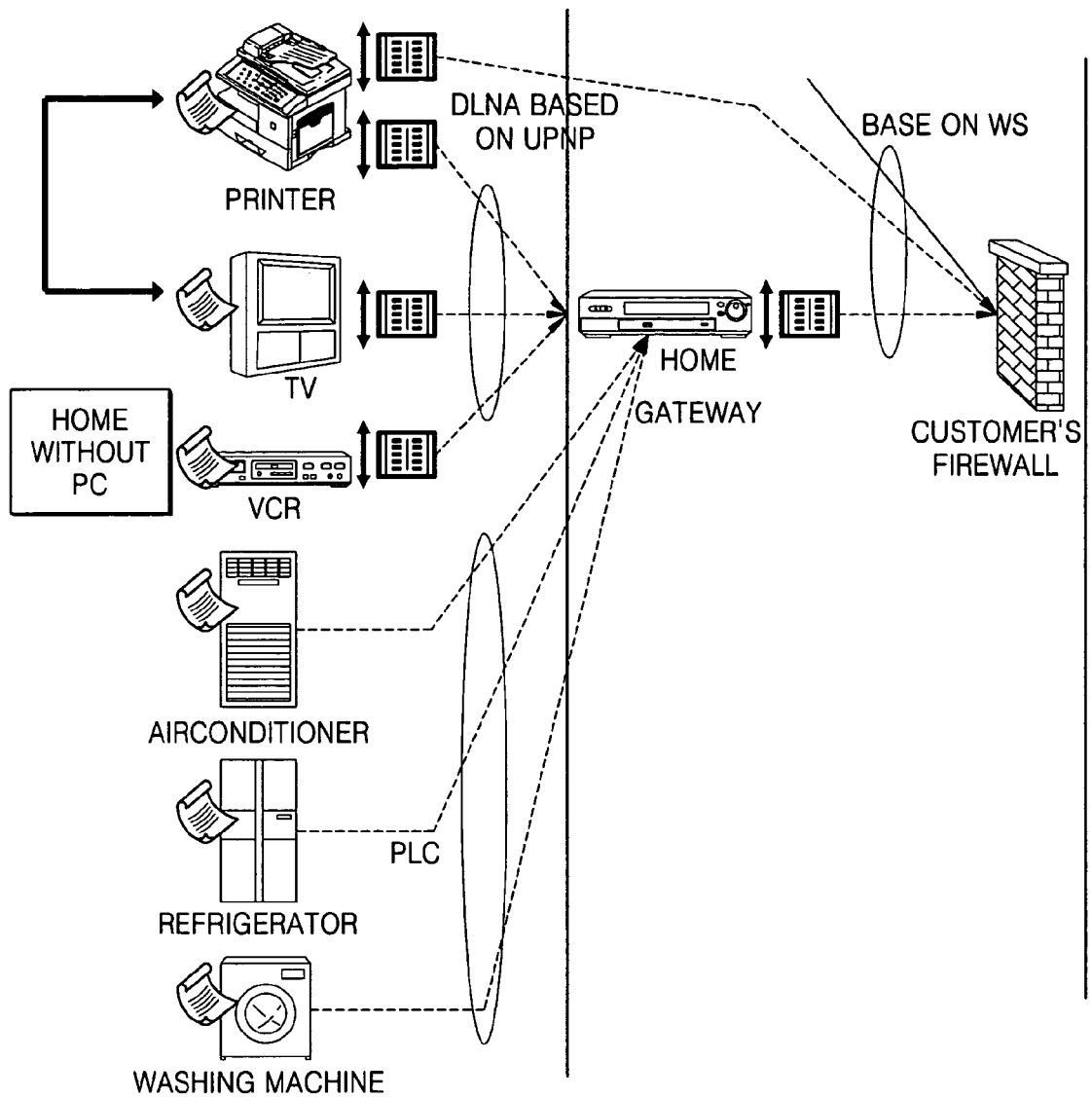
FIG. 3 is a view illustrating an RDS data security apparatus that collects RDS data, displays the RDS data, and selectively transmits the RDS data to a server in a typical home environment that does not include a computer according to an exemplary embodiment of the present invention.

FIG. 3 is a view illustrating an RDS data security apparatus that collects RDS data, displays the RDS data, and selectively transmits the RDS data to a server in a typical home environment that does not include a computer according to an exemplary embodiment of the present invention.

Figure 4:
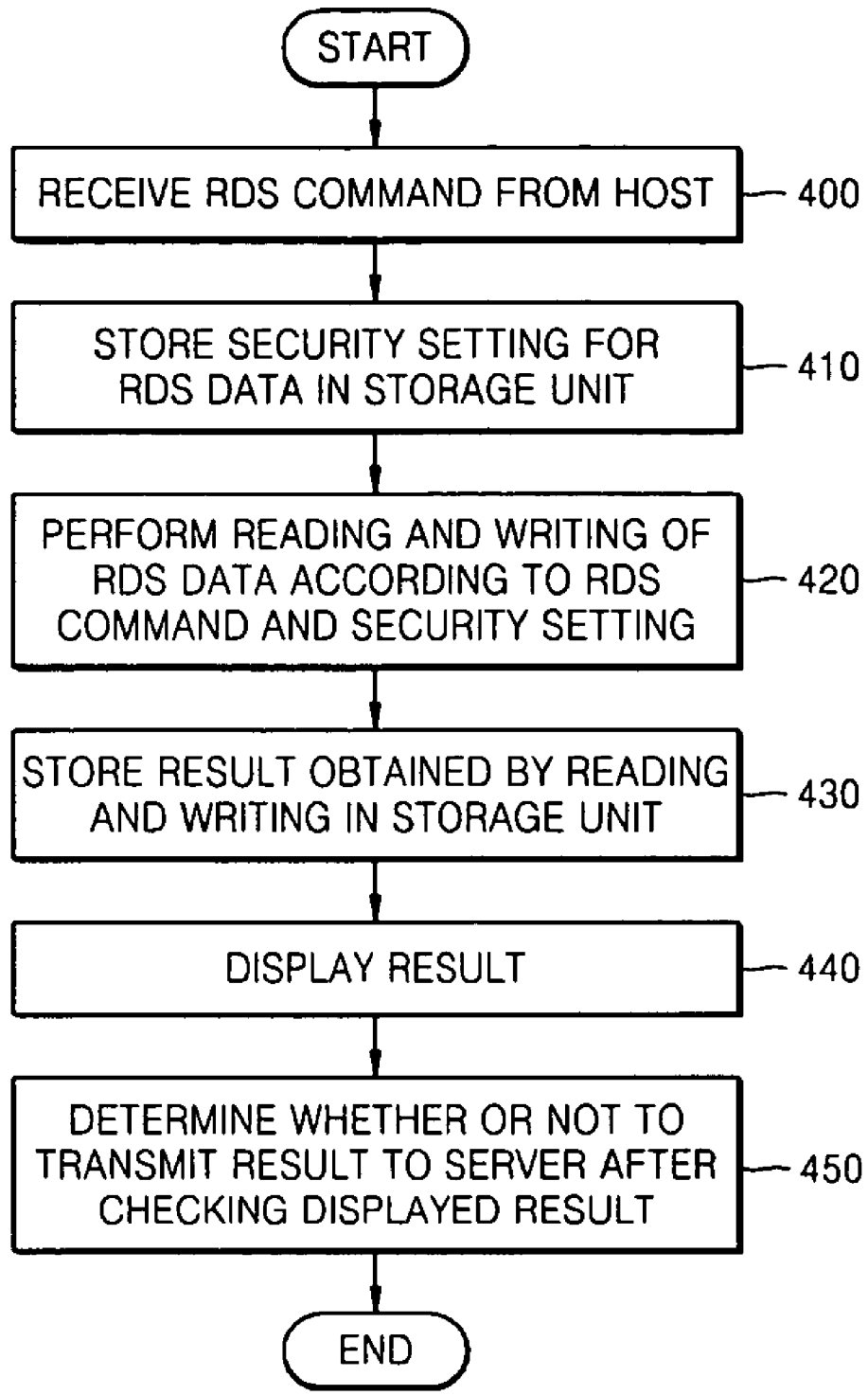
FIG. 4 is a flowchart illustrating an RDS data security method according to an exemplary embodiment of the present invention.

FIG. 4 is a flowchart illustrating an RDS data security method according to an exemplary embodiment of the present invention. The RDS data security method will be now described with reference to FIGS. 1 and 4.

Referring to FIGS. 1 and 4, an RDS command is received from a host (not shown) through the interface unit 100 (Step 400). A user stores a security setting for the RDS data in the storage unit 110 (Step 410). The security setting may require authentication for information requiring data security according to the importance of the RDS data.

Reading and writing operations of the RDS data are performed according to the RDS command and the security setting stored in the storage unit 110 (Step 420). Since, authentication requirements for the same RDS data are different according to the type of reading and writing operations, an operation is allowed in accordance with the security setting. When the RDS data requires an authentication but the RDS data is incorrectly authenticated or not authenticated, the display unit 130 displays an error message, and the operation is not performed.

After the reading and writing operations of the RDS data are performed, a result obtained by the reading and writing operations is stored in the storage unit 110 (Step 430). The display unit 130 displays the result stored in the storage unit 110 (Step 440). The display unit 130 may be included in the RDS data security apparatus, or implemented as an external device connected to the RDS data security apparatus via a network.

A user determines whether to transmit the result to the server after checking the result displayed on the display unit 130 (Step 450).

The exemplary embodiments of the present invention can be written as computer programs and can be implemented in general-use digital computers that perform the programs using a computer readable recording medium. Examples of the computer readable recording medium include magnetic storage media (for example, ROM, floppy disks, hard disks, and the like), optical recording media (for example, CD-ROMs, or DVDs), and storage media such as carrier waves (for example, transmission through the Internet).

According to certain exemplary embodiments of the present invention, since reading and writing operations of RDS data are performed according to an RDS command received from a host and previously stored security setting, and the result obtained by the reading and writing operations is displayed, data collected in the RDS can be prevented from being transmitted to a server without permission, and data allowed to an authorized user can be transmitted to the server.

While the present invention has been particularly shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A remote diagnostic system (RDS) data security apparatus comprising:
   an interface unit for receiving an RDS command from a host;
   a storage unit for storing a security setting for RDS data; and
   a control unit for performing an operation for the RDS data according to the RDS command and the security setting;
   a display unit for displaying the result, and
   wherein the control unit determines whether to transmit the results stored in the storage unit to a server according to a command input after the result displayed on the display unit is verified, and the security setting and selectively outputs a result of the operation determined to be transmitted to the server.

2. The apparatus of claim 1, wherein the control unit stores the result obtained by performing the operation for the RDS data.

3. The apparatus of claim 1, wherein the display unit comprises at least one of an internal device included in the RDS data security apparatus and an external device connected to the RDS data security apparatus via a network.

4. The apparatus of claim 1, wherein the security setting comprises authentication according to the importance of the RDS data.

5. The apparatus of claim 4, wherein the control unit parses the RDS command to determine whether the RDS data requires authentication, and when a determination is made that the RDS data requires authentication, an error message is displayed on the display unit if the RDS data comprises at least one of incorrectly authenticated and not authenticated data.

6. The apparatus of claim 4, wherein the security setting comprises different authentication requirements for the same RDS data according to a type of operations.

7. The apparatus of claim 1, wherein the security setting comprises a determination whether to transmit the RDS data to the server according to an encryption level of the RDS data.

8. An RDS data security method comprising:
   receiving an RDS command from a host;
   storing a security setting for RDS data in a storage unit;
   performing an operation for RDS data according to the RDS command and the security setting;
   displaying the result on a displaying unit after the performing of the operation;
   determining whether the result stored in the storage unit is transmitted to a server according to a command input after the result displayed on the display unit is verified, and the security setting; and
   selectively outputting a result of the operation determined to be transmitted to the server.

9. The method of claim 8, further comprising storing the result in the storage unit after the performing of the operation.

10. The method of claim 8, wherein the display unit comprises at least one of an internal device included in an RDS data security device and an external apparatus connected to the RDS data security apparatus via a network.

11. The method of claim 8, wherein the security setting comprises authentication according to the importance of the RDS data.

12. The method of claim 11, wherein the performing of the operation further comprises determining whether the RDS data requires authentication by parsing the RDS command, and when a determination is made that the RDS data requires authentication, displaying an error message on the display unit if the RDS data comprises at least one of incorrectly authenticated and not authenticated data.

13. The method of claim 11, wherein the security setting comprises different authentication requirements for the same RDS data according to a type of operations.

14. The method of claim 8, wherein the security setting comprises a determination whether to transmit the RDS data to the server according to an encryption level of the RDS data.

15. A computer readable recording medium having embodied thereon a computer program for executing a method of claim 8.

* * * * *